United States Patent [19]

Seebode

[11] Patent Number: 5,194,192
[45] Date of Patent: Mar. 16, 1993

[54] METHOD FOR PREPARING WATERTIGHT AND FIREPROOF CABLE DUCTS THROUGH CEILINGS AND WALLS

[75] Inventor: Heinrich Seebode, Hamburg, Fed. Rep. of Germany

[73] Assignee: STN Systemtechnik Nord GmbH, Bremen, Fed. Rep. of Germany

[21] Appl. No.: 784,694

[22] Filed: Oct. 30, 1991

[30] Foreign Application Priority Data

Nov. 19, 1990 [DE] Fed. Rep. of Germany ....... 4036792

[51] Int. Cl.⁵ .................. B32B 31/04; E04B 1/16; F16L 5/02; H02G 3/04
[52] U.S. Cl. .................. 264/35; 52/232; 52/743; 138/149; 138/DIG. 2; 174/48; 248/49; 248/56; 264/258; 264/261; 264/263; 264/269; 264/279
[58] Field of Search .................. 264/31-35, 264/257, 258, 259, 261, 263, 267, 269, 86, 279, 279.1, 333; 52/232, 743; 138/149, DIG. 2; 174/48; 248/56, 49

[56] References Cited

U.S. PATENT DOCUMENTS

| | | | |
|---|---|---|---|
| 2,773,512 | 12/1956 | Burk | 264/35 |
| 3,742,674 | 7/1973 | Lang | 52/39 X |
| 3,885,636 | 5/1975 | Hildebrandt | 174/15.5 |
| 3,976,82? | 8/1976 | Anderberg . | |
| 4,061,344 | 12/1977 | Bradley et al. | 174/151 X |
| 4,190,547 | 2/1980 | Mahnke et al. | 106/15.05 |
| 4,276,332 | 6/1981 | Castle | 52/232 X |
| 4,278,468 | 7/1981 | Selbe et al. | 264/333 X |
| 4,620,404 | 11/1986 | Rizk | 52/602 |
| 4,835,831 | 6/1989 | Melton | 427/427 X |
| 5,017,314 | 5/1991 | Zemanek et al. | 264/36 X |

FOREIGN PATENT DOCUMENTS

| | | |
|---|---|---|
| 2632325 | 1/1978 | Fed. Rep. of Germany . |
| 8223458 | 3/1983 | Fed. Rep. of Germany . |
| 2378909 | 8/1978 | France . |
| 8000205 | 7/1980 | PCT Int'l Appl. . |
| 2038566 | 7/1980 | United Kingdom . |

OTHER PUBLICATIONS

Geaquello ®for Secure Cable Compartmentalization.

Primary Examiner—Karen Aftergut
Attorney, Agent, or Firm—Merchant & Gould Smith, Edell, Welter & Schmidt

[57] ABSTRACT

A method for preparing watertight and fireproof cable ducts through walls and ceilings. Cables are inserted into shaped parts, spacing the cables in the plane of the cable duct's frontal area. The remaining spaces between the wall of the cable duct and the spacers are filled with pieces of the same material. The modules used to construct the frontal walls include fibrous insulating material, such as long-fiber fiber glass insulating material or rock wool.

3 Claims, 1 Drawing Sheet

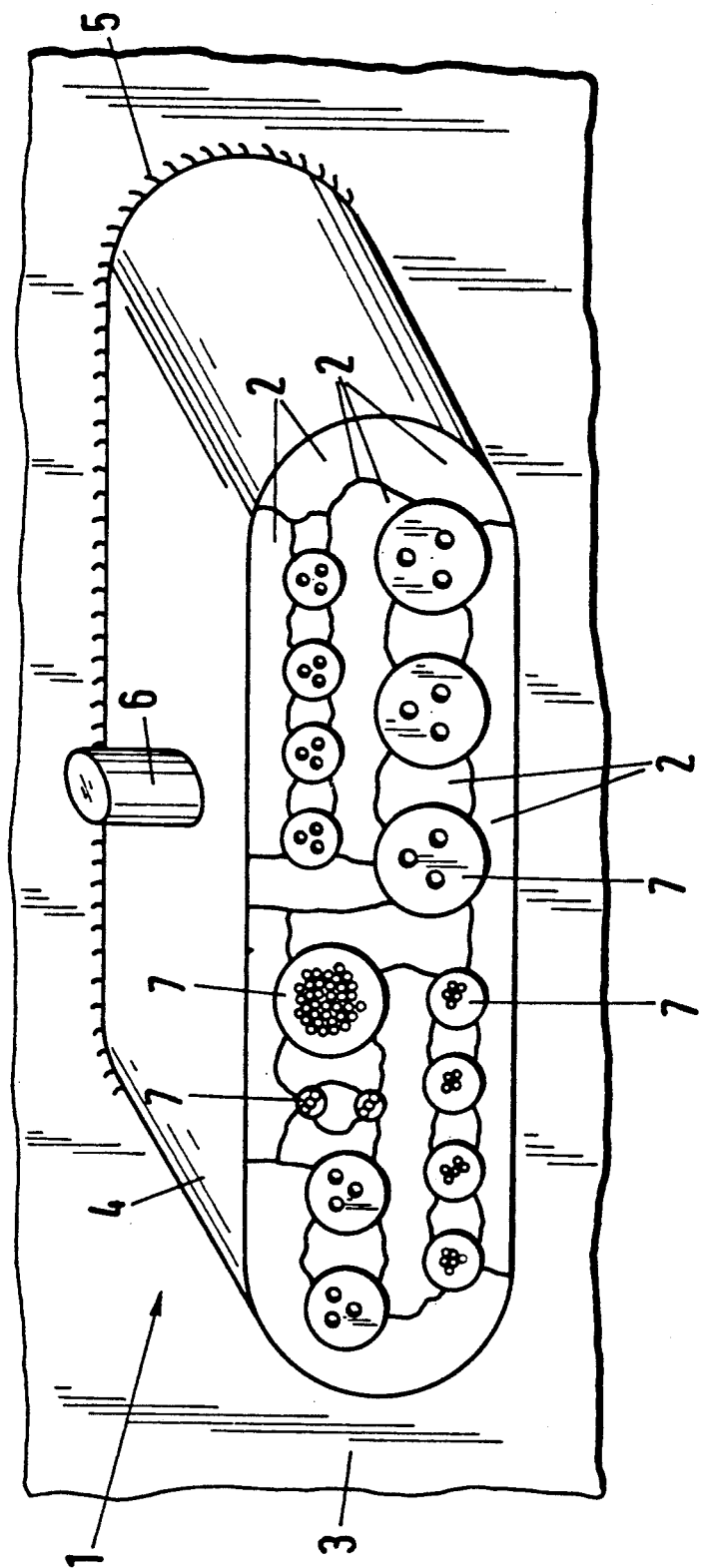

METHOD FOR PREPARING WATERTIGHT AND FIREPROOF CABLE DUCTS THROUGH CEILINGS AND WALLS

The invention pertains to a method for preparing watertight and fireproof cable ducts through ceilings and walls, consisting of a hollow tube of specified length whose frontal areas will be sealed after all cables have been pulled through and which will be filled with an age-hardening pourable compound consisting of two components, where the cables will be inserted into shaped parts, spacing the cables, in the plane of the cable duct's frontal areas and where the remaining spaces between the wall of the cable duct and the spacers will be filled with pieces of the same material.

Using this method, known from the DE 29 08 238 C2, an absorbent material, capable of swelling and compressed in two planes, is used for creating the frontal areas which are pretreated, prior to being filled with the pourable compound, with a liquid which achieves a hardening of the compound as well as a refractoriness in addition to having a swelling effect. Silica sol can be used as the liquid.

The object of the invention is to propose a simplified method which reduces the manufacturing cost.

According to the invention, this objective is achieved by using modules made of compressed fibrous insulating material to produce the frontal walls.

Embodiments of the invention are described in the subclaims.

One advantage of the invention over the state of the art described above consists of the fact that a pretreating of the modules by spraying with a liquid is not necessary, because the fiberglass insulating material according to DIN 4102 is not combustible and, in addition, prevents the pourable compound, of an organic or inorganic type, from leaking out. Compared to the previously known method, the advantage is the fact that there is one step less in the procedure.

The illustration shows a top view of the frontal area, based on preparation of a cable duct according to the method of this invention.

The cable duct 1 consists of an oval piece of pipe 4 which is inserted through a wall 3, for example the bulkhead of a ship, and connected to it, in a water- and gastight manner, by means of a welding bead 5. The cables passing through the cable duct 1 are identified as 7, whereby these cables are kept at a distance from each other and from the inner wall of the piece of pipe 4 by modules 2, made of compressed fibrous insulating material. The modules 2 can consist of long-fiber fiberglass material or of fibrous insulating material made of stone (rock wool).

To prepare the cable duct, following the insertion of all cables 7 into the piece of pipe 4, the spaces between the cables 7 themselves and between the cables 7 and the interior wall of the piece of pipe 4 are filled with the modules 2. After all spaces and openings have been filled, the entire packet of material is under some pressure and is then filled with a fireproof, pourable compound through one or several filler necks 6 into the interior of the cable duct 1. The pourable compound penetrates the modules 2 of compressed fibrous insulating materials and forms, with them, a fireproof and tight frontal wall after it has hardened. The following pourable compounds comprising a liquid and a powder as two components to be mixed together, generally for use with the GEAQUELLO System for Secure Cable Compartmentalization manufactured by AEG-TELEFUNKEN can be used:

e.g. pourable compound E 795 inorganic
e.g. pourable compound E 950 inorganic
e.g. pourable compound E 292 organic.

I claim:

1. A method of preparing a watertight and fireproof cable duct through ceilings and walls, the cable duct including a hollow body of specified length having an interior wall and frontal areas, through which cable duct cables are pulled, the method of comprising the steps of:
   (a) inserting the cables into the hollowing body of the cable duct;
   (b) providing shaped parts for spacing the cables in a plane of at least one of the frontal areas of the hollow body and for filling all spaces and openings between the spaced cables, and between the spaced cables and the interior wall of the hollow body, wherein the shaped parts are modules made of compressed fibrous insulating material, such that a pretreating of the modules in a step of applying a liquid sealant thereto is not performed because the modules of compressed fibrous insulating material prevent a pourable compound from leaking out of the cable duct when filled into the cable duct;
   (c) spacing the cables inserted into the hollow body in the plane of the at least one of the frontal areas with the modules of compressed fibrous insulating material;
   (d) filling the spaces and openings between the spaced cables and between the spaced cables and the interior wall of the hollow body with the modules of compressed fibrous insulating material;
   (e) filling an age-hardenable, pourable compound comprising two components into the cable duct such that the pourable compound penetrates the modules of compressed fibrous insulating material and forms therewith the watertight and fireproof cable duct upon hardening of the compound; and
   (f) allowing the pourable compound to harden and form the watertight and fireproof cable duct with the modules of compressed fibrous insulating material.

2. The method according to claim 1, wherein long-fiber fiberglass insulating materials are used for the modules.

3. The method according to claim 1, wherein fibrous insulating materials comprising mineral wool are used for the modules. m

* * * * *